Feb. 8, 1944.  D. J. DAVIS  2,341,138
CYLINDER HEAD GAUGE
Filed Feb. 27, 1941  2 Sheets-Sheet 1

Inventor
Dwillard J. Davis
By Blackmore, Spencer & Hunt
Attorneys

Feb. 8, 1944.  D. J. DAVIS  2,341,138
CYLINDER HEAD GAUGE
Filed Feb. 27, 1941  2 Sheets-Sheet 2

Inventor
Dwillard J. Davis
By Blackmore, Spencer & Clink
Attorneys

Patented Feb. 8, 1944

2,341,138

UNITED STATES PATENT OFFICE 2,341,138

CYLINDER HEAD GAUGE

Dwillard J. Davis, Detroit, Mich., assignor to General Motors Corporation, Detroit, Mich., a corporation of Delaware Application February 27, 1941, Serial No. 380,953

4 Claims. (Cl. 73—51)

This invention relates to gauges. The novel instrument has been designed for use with internal combustion engines and operates to determine whether the volumetric capacity of the combustion chamber of the cylinder head is within certain predetermined limits. It should be stated that the invention is not limited to the specific use for which it has been primarily designed.

An object of the invention is a machine for quickly but accurately determining whether or not a chamber to be measured has a capacity between predetermined limits.

Other objects and advantages will be understood from the description which follows.

Figure 1:
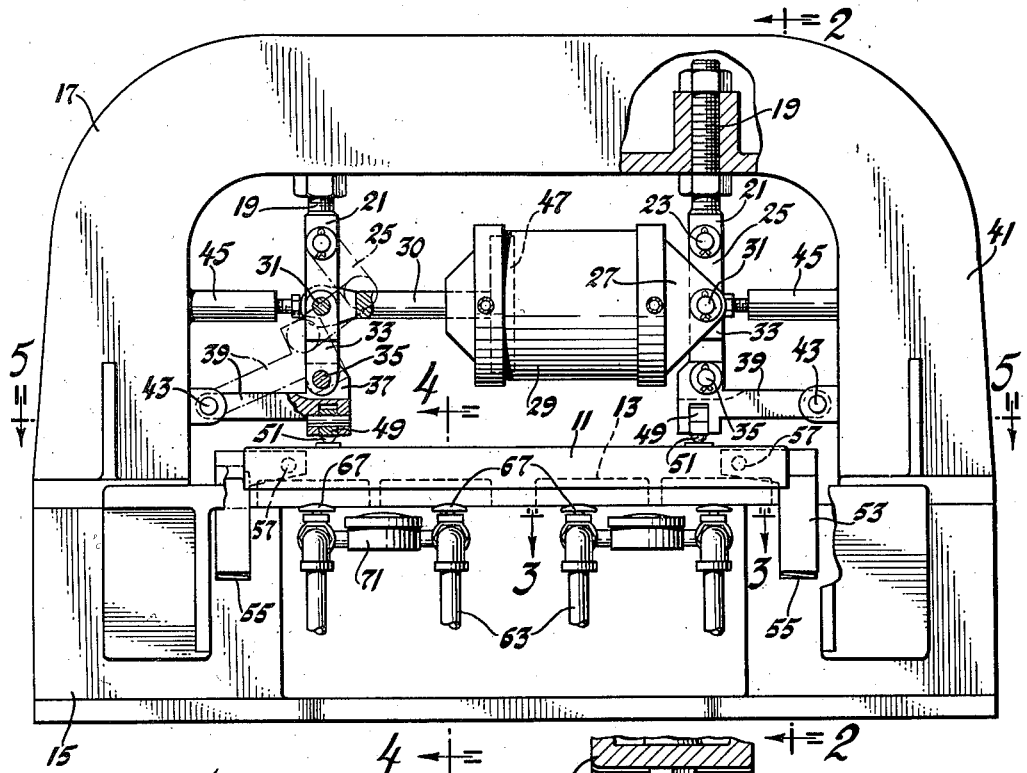
Figure 1 is a view in side elevation.
Figure 2:
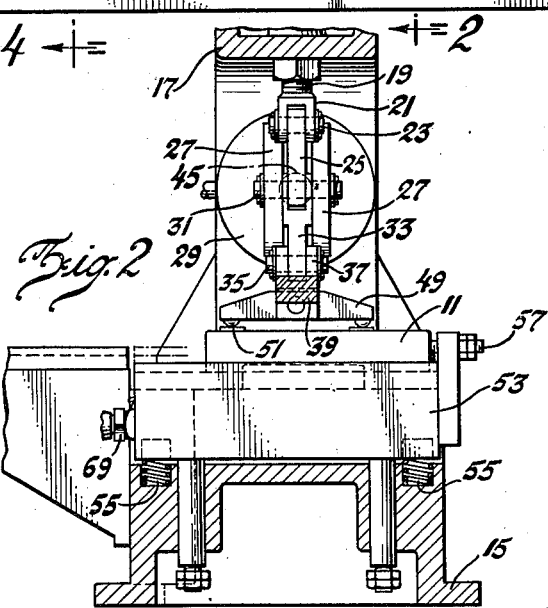
Figure 2 is a view in end elevation, partly in section, as seen from line 2—2 of Figure 1.
Figure 3:
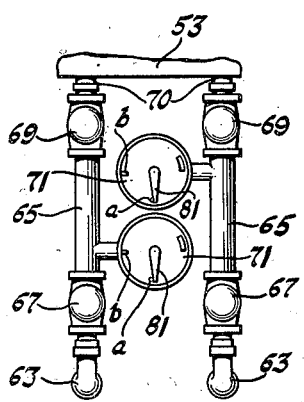
Figure 3 is a plan view as seen from line 3—3 of Figure 1.
Figure 4:
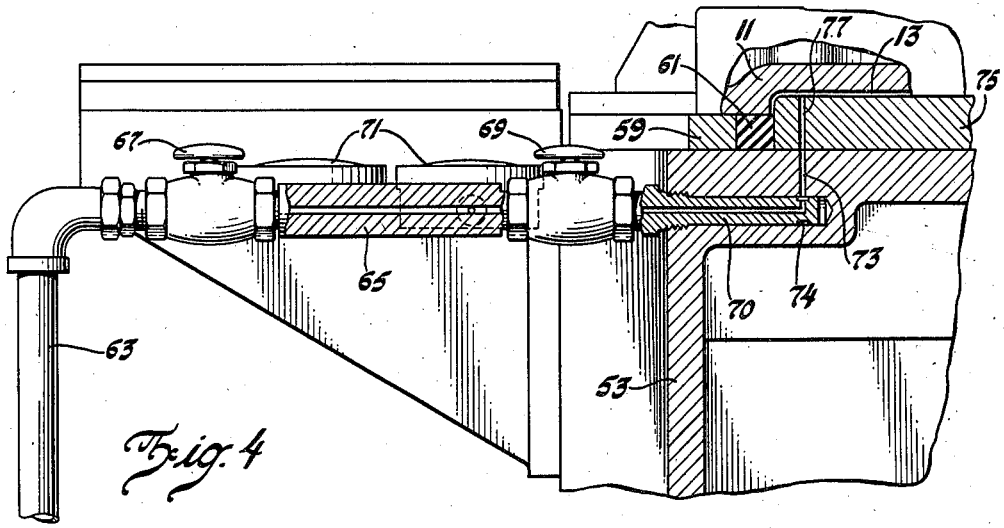
Figure 4 is a section on line 4—4 of Figure 1.
Figure 5:
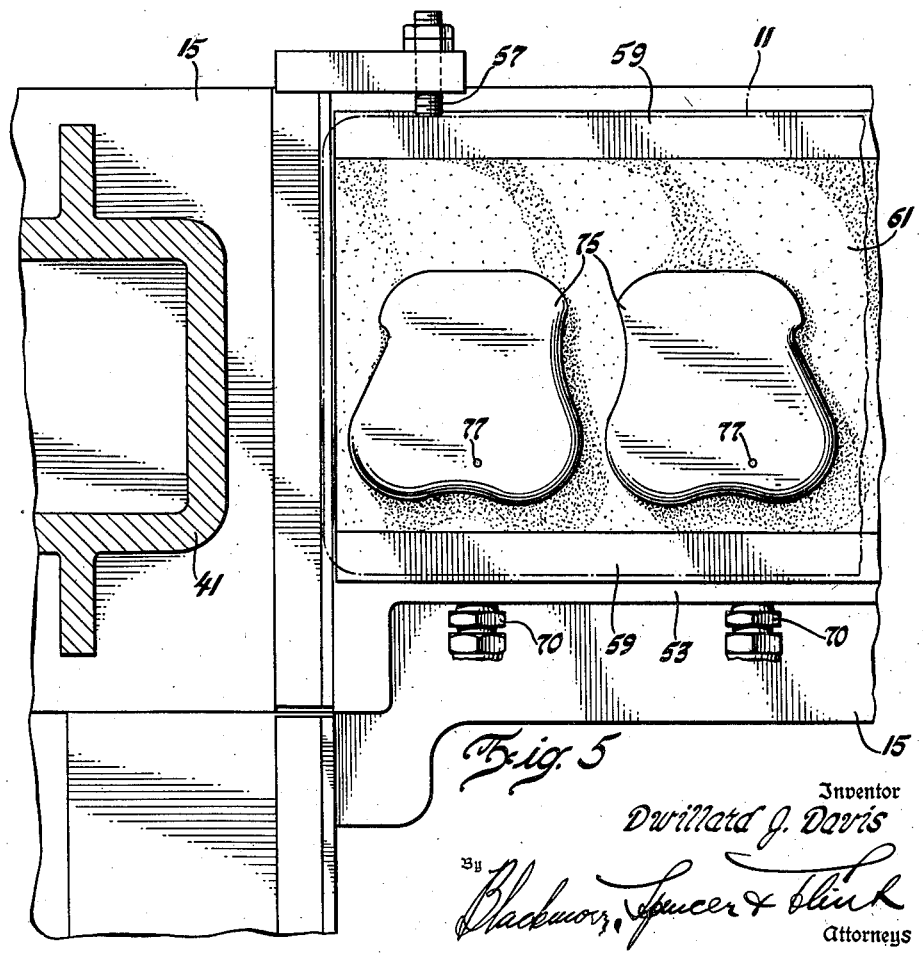
Figure 5 is a plan view partly in section, substantially as seen from line 5—5 of Figure 1, with the cylinder head represented by dot and dash line.

In the recent development of internal combustion engines, fuels of comparatively high octane value have become available and these fuels have made possible engines with comparatively high compression ratios. This makes it necessary to more accurately maintain the combustion chamber volume within certain upper and lower limits. In one instance three cubic centimeters has been set as the permitted variation in the capacity of the combustion chamber of the cylinder head. This space must be accurately measured to make sure that it is within the predetermined limits. Various methods of measurement have been proposed, but, for the most part, they are slow of execution and rather inaccurate in their results. It is to improve upon such prior process and instruments that the present invention has been made.

Reference is made to the drawings where numeral 11 is used to designate a cylinder head, the combustion chambers 13 of which are to be measured. The instrument has been designed to test the capacity of these spaces and to make sure that the capacity is accurate to within three cubic centimeters.

Numeral 15 marks the base of the machine. A casting 17 of somewhat U shape rises from the base. Near each end of the arch of the casting is a threaded stem 19 having forked ends 21 carrying a pin 23 to pivot a link 25. One link 25 extends between and is pivoted to lugs 27 extending from a cylinder 29. The pivot pin is marked 31. The other link 25 is terminally pivoted to a piston rod 30. Also pivoted on each pin 31 is the forked end of a link 33, the latter being pivoted by a pin 35 between lugs 37 of a link 39. Links 39 are pivoted to the upright ends 41 of the U shaped casting as at 43. Suitable adjustable limiting stops may be used. Such stops are shown at 45 and are carried by the arms 41.

Air under pressure is to be admitted to cylinder 29 whereby piston 47 and cylinder 29 assume the full line positions of Figure 1, this figure also showing by dotted lines the positions assumed by one of the linkages when the toggle is broken. The links 39 carry feet 49 provided with abutments 51 which are adapted to engage the cylinder head and force it downwardly when the toggle links are straightened.

At 53 is a supporting member. It is resiliently held by springs 55. On the top of member 53 are suitable positioning expedients for the cylinder head. Such expedients include locating devices 57. They also include stop members 59 to limit the downward movement of the head. To seal the head there may be used a compressible member such as a ring 61 of rubber or the like.

There is provided a source of compressed air not shown. Also not shown there will be a conduit from the compressed air source, the conduit preferably having any suitable cutoff valve, a pressure gauge and pressure regulating valve. This conduit with its valves will supply a manifold from which lead-in pipes 63 are provided, one for each combustion chamber. Since no novelty is claimed for the reservoir and the conduits and valves leading to the lead-in pipes and since they may be of any known form, these parts are not illustrated.

From the end of each pipe 63 there extends a pipe 65 having valves 67 and 69, one at each end. A pressure gauge 71 is connected to the restricted passage of each pipe 65 between the valves 67 and 69. From valve 69 the air flow is continued through a threaded nipple 70 having an axial and a radial passage as shown, the nipple being threaded into an opening in the supporting member 53. This member 53 has a passage 73 open to a circumferential groove 74 with which the radial passage of the nipple communicates. An important feature of the instrument is the filler block 75. It is shaped to correspond with the shape of the combustion chamber. It is carried upon member 53 and nearly, but not quite, fills the combustion chamber. The block is of predetermined dimensions and is apertured at 77 to register with passage 73.

It will be evident that the error range—3 cc.—will be a much larger fractional part of the reduced combustion chamber space than it would have been were it compared to the full space which would be necessary were the block 75 not used. The use of this block and the provision of the restricted passages in pipe 65, the nipple and the support and block aid in giving the instrument a high degree of accuracy.

In using the device the cylinder head is placed in position and the air pressure straightens the toggles to seal its chambers. With valve 69 closed, valve 67 is opened and air pressure at a predetermined pressure—90 pounds per square inch is suggested—prevails up to valve 69. Valve 67 is then closed and valve 69 is opened. The pointer 81 of the gauge now turns to show a reduced pressure. It is reduced because of the air flow from the region of high pressure—between the valves—to the passages and to the combustion chamber. The gauge will have two marks as *a* and *b*. As the pointer swings if it comes to rest betwen marks *a* and *b* it will be known that the chamber capacity is accurate within the permitted error, the marks having been made to correspond with such pressures. If the pointer lies outside the limits, the capacity is either too great or too small. By the use of the block 75 and applying the error to a greatly reduced volume the accuracy of the reading is greatly increased. It is obvious that the readings may be made with great rapidity.

I claim:

1. A gauge for testing the capacity of the combustion chamber of the cylinder head of an engine comprising means to support said head with its combustion chamber closed from communication with the air, means constituting a trap for air under pressure, said trap means having a capacity much less than that of said chamber, conduit means whereby air from said trap may be admitted to said chamber and indicating means associated with said trap to register a fall of air pressure whereby the chamber being tested may be compared with a chamber of known capacity, said first named means comprising a supporting member, resilient means to mount said supporting member, means to locate and seal said head on said supporting member and air pressure mechanism to force said head upon said supporting means against the resistance of said resilient means.

2. A gauge for testing the capacity of the combustion chamber of the cylinder head of an engine comprising means to support said head with its combustion chamber closed from communication with the air, means constituting a trap for air under pressure, said trap means having a capacity much less than that of said chamber, conduit means whereby air from said trap may be admitted to said chamber and indicating means associated with said trap to register a fall of air pressure whereby the chamber being tested may be compared with a chamber of known capacity, said first named means comprising a supporting member, resilient means to mount said supporting member, means to locate and seal said head on said supporting member and air pressure mechanism to force said head upon said supporting member, said air pressure mechanism comprising a fluid pressure cylinder, a piston having a rod, a U-shaped frame, links pivoted to the arms of said frame and having feet to engage said cylinder head, links to support both said cylinder and the piston rod from said U-shaped frame and other links connecting the first mentioned links and the cylinder and piston rod whereby a toggle action is effected.

3. A gauge for testing the capacity of the chamber of a chambered member, said gauge comprising a support for said member, means to hold said member upon said support with its chamber adjacent the surface of said support, a conduit associated with said support and adapted to conduct air under pressure to said chamber, said conduit including a passage of restricted dimension, valves at each end of said passage and register means between said valves and communicating with said passage.

4. The invention defined by claim 3 together with a filler block to be placed within said chamber to increase the efficiency of said register means.

DWILLARD J. DAVIS.